Feb. 21, 1939.  L. E. LA BRIE  2,148,273
HYDRAULIC BRAKE OPERATING MEANS
Filed July 29, 1935
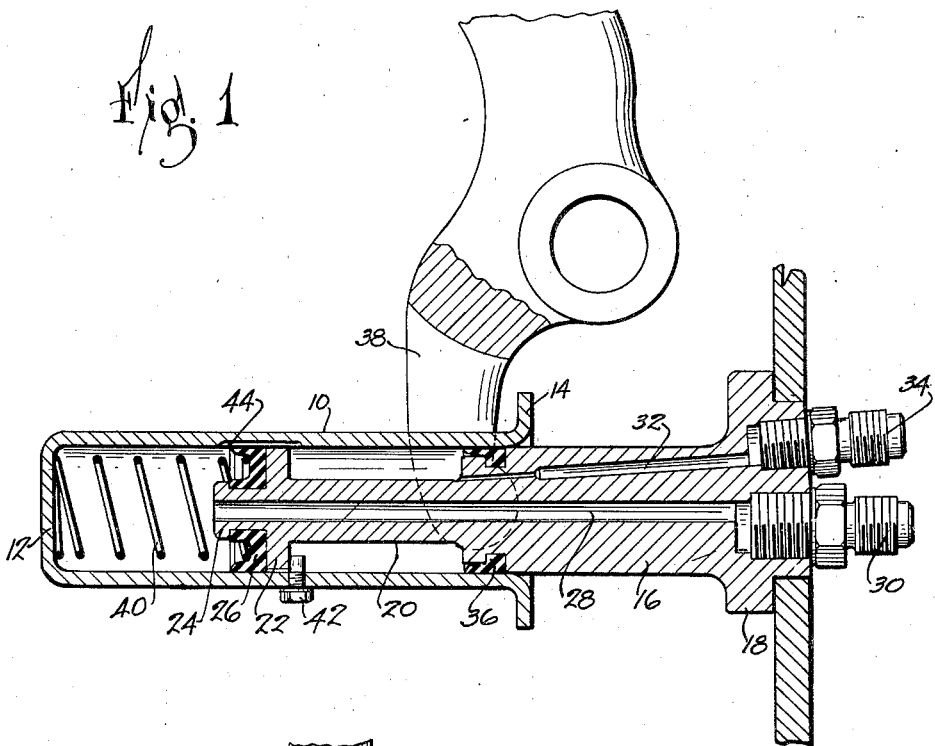
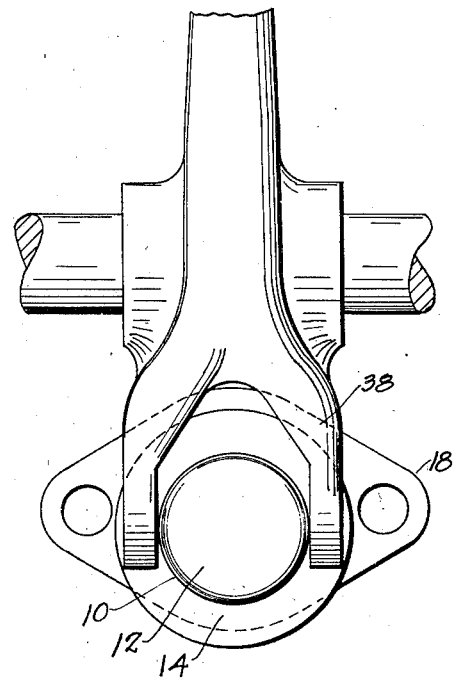
INVENTOR.
LUDGER E. LA BRIE
BY
ATTORNEY.

Patented Feb. 21, 1939

2,148,273

UNITED STATES PATENT OFFICE 2,148,273

HYDRAULIC BRAKE OPERATING MEANS

Ludger E. La Brie, South Bend, Ind., assignor to Bendix Products Corporation, South Bend, Ind., a corporation of Indiana Application July 29, 1935, Serial No. 33,731

1 Claim. (Cl. 60—54.6)

This invention relates to hydraulic brake systems and particularly to a master cylinder and piston construction of extreme simplicity. The invention further has to do with the construction of a master cylinder and piston capable of ready disassembly for inspection and repair.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claim.

In the drawing wherein like reference numerals indicate like parts:

Fig. 1 is a vertical section thru the master cylinder showing the details thereof; and Fig. 2 is an end view of the master cylinder.

Referring to the drawing, there is shown a reciprocating cylinder 10 formed of a tubular member having a closed end 12 and a flange 14 about its open end. The cylinder is adapted to reciprocate upon a piston member 16 which has a flange 18 adapted for securing the same to a suitable support. The piston is provided with an annular cut away portion 20 providing a flange or piston head 22 which is provided on the face thereof with a stop knob 24 and annular cup washer 26. The piston is bored thru its center to provide a discharge port 28 which extends the entire length of the piston member to the pipe fitting 30.

In order to connect the piston and cylinder to a supply reservoir the piston is provided with a longitudinal eccentric port or bore 32, leading from the annular cut away portion behind the piston head to an external pipe fitting 34, suitably adapted for a reservoir connection.

To prevent leakage a second annular washer 36 is provided on the piston back of the annular cut away portion.

Actuation of the cylinder shell relative to the stationary piston member is accomplished by the engagement of a bifurcated lever 38 with the shell flange 14 and return movement of the cylinder shell due to the spring 40 is limited by the screw pin 42 in the shell suitably positioned to engage the piston head 22. To provide a compensating port for liquid to enter the compression portion of the cylinder, a short groove 44 is provided in the inside wall of the cylinder so that communication with the reservoir is established when the cylinder and piston are in relative release position.

Although but a single modification has been illustrated and described, it is to be understood that the invention is not limited thereto. As various changes may be made in the disclosed simple construction without departing from the spirit of the invention, as will be well understood by those skilled in the art, reference will be had to the appended claim for a definition of the limits of the invention.

What is claimed is:

A master cylinder for hydraulic brakes comprising a rigidly mounted stationary piston, a discharge port extending axially therethrough, an annular cut-away portion adjacent the head of the piston, a port extending from the cut-away portion to the outer end of said piston, a cylindrical shell closed at one end and having a flange at the other slidable over said piston member, a pin threaded in said cylinder and projecting into the annular space surrounding the cut-away portion of the piston to determine the released position of the cylinder, a groove in the inside wall of the cylinder extending longitudinally from the head of the piston to the cut-away portion when the cylinder is in released position and a bifurcated operating lever the furcations of which extend on each side of the cylinder and engage said flange in a direction to drive the cylinder onto the piston.

LUDGER E. LA BRIE.